United States Patent [19]

Budoff

[11] 4,137,003
[45] Jan. 30, 1979

[54] DRILL JIG

[76] Inventor: Jules Budoff, 17 Garden Dr., Monticello, N.Y. 12701

[21] Appl. No.: 840,132

[22] Filed: Oct. 7, 1977

[51] Int. Cl.² .................. B23B 47/28; B23B 49/00
[52] U.S. Cl. .................................. 408/103; 144/69; 269/87.3; 408/115 R
[58] Field of Search ....... 408/72 R, 87, 103, 108–110, 408/115 R, 115 B; 33/185 R; 144/69, 70, 93 R; 269/87.1, 87.2, 83.3

[56] References Cited

U.S. PATENT DOCUMENTS

| 2,268,930 | 1/1942 | Edwards | 408/103 |
| 3,708,237 | 1/1973 | Kruse | 408/115 X |

Primary Examiner—Robert Louis Spruill
Attorney, Agent, or Firm—Berman, Aisenberg & Platt

[57] ABSTRACT

A drill jig for producing a rectangular mortise in the flat surface of a workpiece requiring only a portable drill and drill bit. The rectangular slot is intended to snugly house a standard square or hex nut so as to keep it from turning in either direction. The jig also permits production of a pilot hole perpendicular to the mortised slot for receiving the threaded end of a bolt for mating with the embedded nut. The drill jig in a preferred embodiment includes a pair of substantially identical drill guide members, an anvil plate, and a stationary support, all of which are movably disposed on a vertical support member. The workpiece is clamped between the lower drill guide plate and the anvil plate. Each of the drill guide plates includes a channel-shaped member having the desired slot templates formed therein, and a movable template disposed therewithin. The movable templates include a plurality of sets of circular guide holes which are aligned in a prescribed fashion with the template slots for drilling the desired rectangular mortise. Guide holes formed in the vertical support member are utilized to drill the perpendicular guide holes.

8 Claims, 3 Drawing Figures

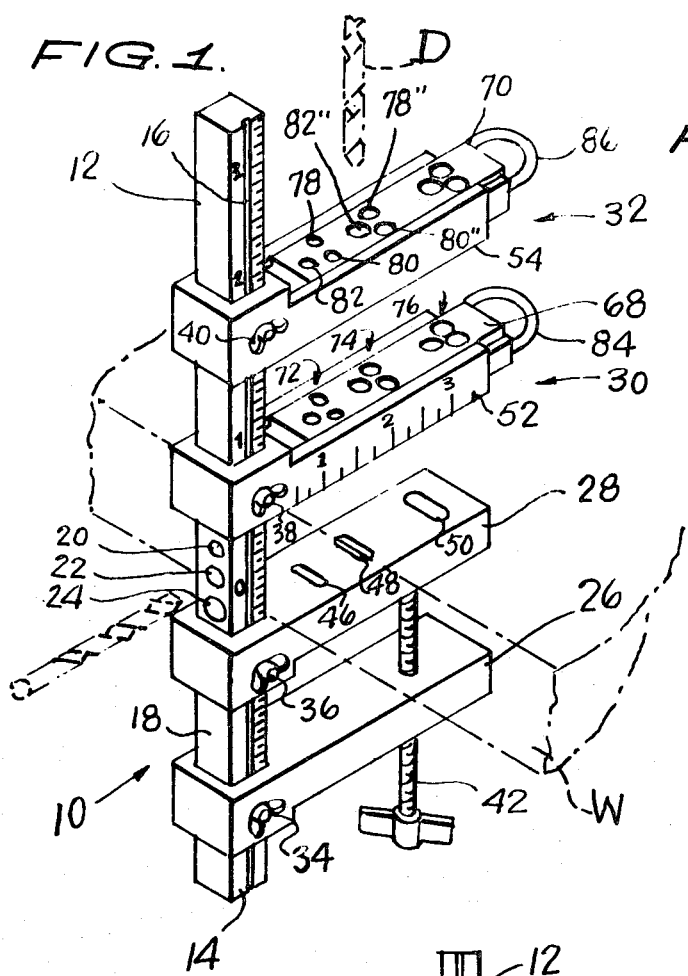
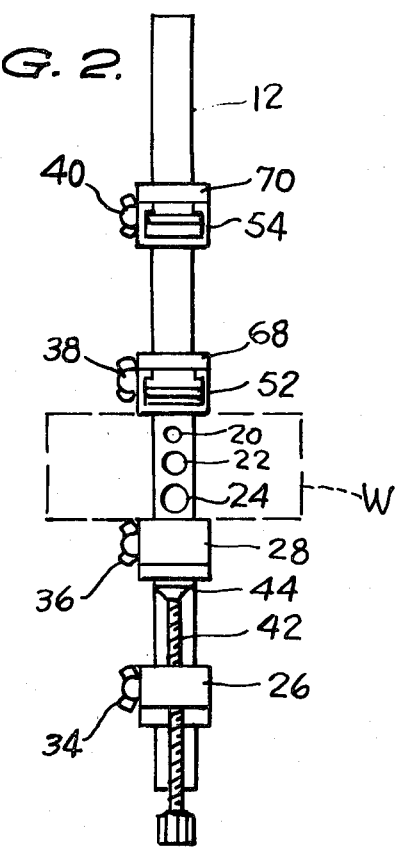
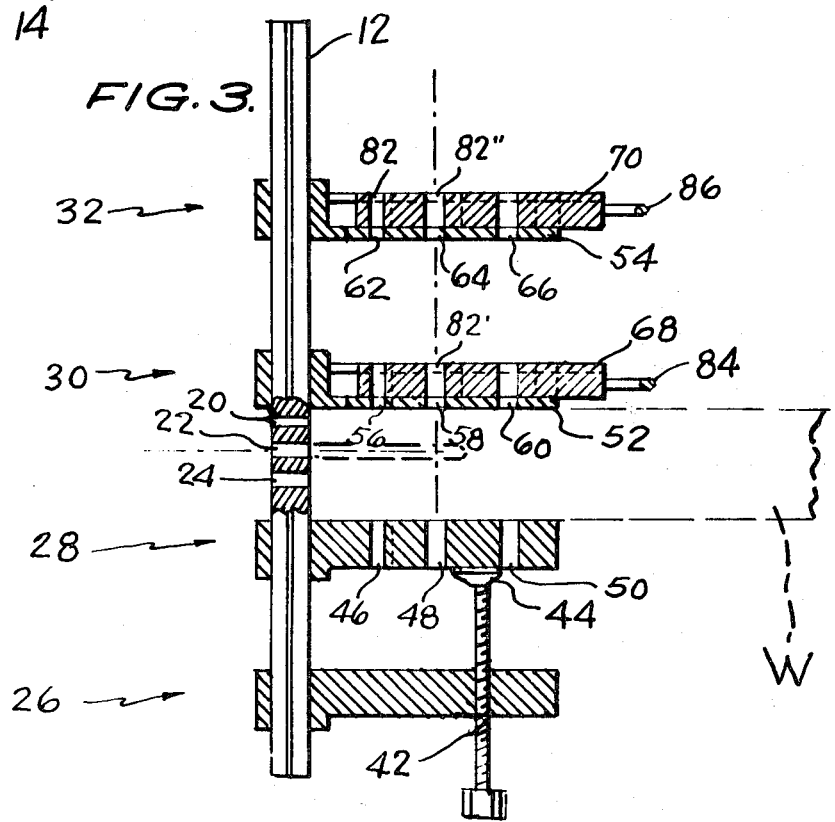

DRILL JIG

BACKGROUND OF THE INVENTION

1. Field of the Invention

The present invention is related to drill jigs and, more particularly, is directed towards a combination drill jig and clamp which facilitates the formation of a rectangular mortise and a pilot hole perpendicular to the mortised slot.

2. Description of the Prior Art

It is desirable to be able to join two pieces of wood together in the strongest manner possible, especially where holding power is minimal as in the end grain of soft wood, to ensure a sturdy joint and end structure. This occurs, for example, when perpendicularly joining two ends of plywood to one another, or in attaching a stepladder rung to its side frame.

One technique which I have developed for ensuring a strong joing between the two wood pieces is to form a rectangular mortise in one piece of wood within which a standard square or hex nut is positioned. A pilot hole is then drilled perpendicular to the plane of the hut for receiving the threaded end of a bolt which serves to fasten the second piece of wood to the first piece by engagement with the nut.

I know of no drill jig presently available which permits such a rectangular mortise and pilot hole to be formed with a standard portable drill and drill bit to enable such joints to be quickly, easily and readily effected.

Prior art United States patents of which I am aware in this general art area include: U.S. Pat. Nos. 2,484,758; 2,811,878; 2,943,653; 3,700,344; and 4,010,943.

OBJECTS AND SUMMARY OF THE INVENTION

It is therefore a primary object of the present invention to provide a drill jig which facilitates the formation of a rectangular mortise and pilot hole perpendicular thereto to permit two pieces of wood to be joined by a nut and bolt.

Another object of the present invention is to provide a drill jig apparatus which permits a rectangular mortise and perpendicular pilot hole to be formed using only a standard portable drill and drill bit.

A still further object of the present invention is to provide a combination drill jig and clamp which permits a rectangular slot and perpendicular slot and perpendicular hole to be easily, accurately and cleanly formed therein, and which are adapted for receiving a standard square or hexagonal nut and threaded bolt.

The foregoing and other objects are attained in accordance with one aspect of the present invention through the provision of a drill jig which comprises an elongated support member, means connected to the support member for clamping a workpiece, and first drill guide means adjustably mounted on the support member and positioned in use adjacent the workpiece for permitting formation of a rectangular mortise therein. The drill guide means more particularly comprises a channel-shaped member having at least one elongated through slot formed therein, and a drill guide plate slidably disposed within the channel-shaped member and including at least three substantially circular guide holes formed therethrough.

More particularly, the three guide holes formed in the guide plates are disposed in a triangular configuration, two of the three holes being aligned over the respective ends of the elongated through slot in the channel-shaped member, while the third guide hole is aligned over the middle of the elongated through slot, the three holes tending to overlap so as to form the desired slot. The channel-shaped member further includes a plurality of differently sized elongated through slots, and the drill guide plate includes a plurality of sets of three substantially circular guide holes, the holes within each of the sets corresponding in diameter with the width of respective ones of the elongated through slots.

In accordance with other aspects of the present invention, second drill guide means are adjustably mounted on the support member of the first drill guide means for providing control of the depth of the rectangular mortise in the workpiece. The second drill guide means is substantially identical to the first drill guide means. The clamping means comprises a horizontally disposed support member which is also adjustably mounted to the elongated support member and which is disposed below the first drill guide means. A clamp support member is also mounted to the elongated support member and is disposed below the horizontal support member and has a threaded clamping means extending therethrough for urging the horizontal support member towards the first drill guide means for clamping the workpiece therebetween. More particularly, the horizontal support member includes at least one elongated through slot formed therein which is aligned with and substantially identical to the elongated through slot formed in the channel-shaped guide member.

In accordance with yet other aspects of the present invention, the elongated support member includes at least one guide hole extending transversely therethrough for permitting formation of a pilot hole in the workpiece which is substantially perpendicular to the rectangular mortise. The rectangular mortise is adapted for holding a nut, while the pilot hole is adapted for receiving a bolt that threadingly engages the nut.

BRIEF DESCRIPTION OF THE DRAWINGS

Various objects, features and attendant advantages of the present invention will be more fully appreciated as the same become better understood from the following detailed description of the present invention when considered in connection with the accompanying drawings, in which:

FIG. 1 is a perspective view illustrating a preferred embodiment of the drill jig of the present invention;

FIG. 2 is an end view of the preferred embodiment illustrated in FIG. 1; and

FIG. 3 is a side, partially broken and sectional view of the components of the preferred embodiment of the present invention illustrated in FIG. 1.

DETAILED DESCRIPTION OF THE PREFERRED EMBODIMENT

Referring now to the drawings, wherein like reference numerals represent identical or corresponding parts throughout the several views, and more particularly to FIG. 1 thereof, a preferred embodiment of the drill jig of the present invention is indicated generally by reference numeral 10.

The drill jig 10 comprises a vertically disposed support member 12 which is preferably formed of a substantially square piece of metal stock. The support member 12 includes a front face 14 which has a groove 16 extending vertically therealong, for a purpose to be described hereinafter. Front face 14 also preferably has numerical graduations positioned thereon for assisting in the drilling operation.

A side face 18 of the vertically disposed support member 12 is perpendicular to the front face 14 and includes a plurality of through apertures or guide holes 20, 22 and 24 which extend transversely through member 12 in a direction substantially perpendicular to the longitudinal axis thereof. Holes 20, 22 and 24 are of different diameters, such as 3/16 inch, ¼ inch, 5/16 inch, respectively, for receiving similarly sized drill bits. The purpose and function of the apertures 20, 22 and 24 will be described in greater detail hereinafter.

Mounted to the vertically disposed support member 12 are four relatively vertically adjustable, horizontally disposed members indicated by reference numerals 26, 28, 30 and 32. Members 26, 28, 30 and 32 may be secured in desired positions along bar 12 by means of thumb screws 34, 36, 38 and 40, respectively. The purpose of the vertically extending groove 16 along bar 12 is for receiving the end of thumb screws 34, 36, 38 and 40 so as to prevent marring of the bar 12 while permitting members 26, 28, 30 and 32 to be more easily adjusted in height.

The lower member 26 comprises a generally stationary horizontal support having a threaded clamp member 42 extending therethrough. Clamp member 42 has an upper support flange 44 which assists in clamping of the workpiece, in a manner to be described in more detail hereinafter.

The member 28 more particularly comprises a unitary anvil plate which both serves as a lower clamp member as well as a guide when it is desired to drill through holes in the workpiece. The anvil plate 28 has a plurality of differently sized elongated slots 46, 48 and 50 extending therethrough. The width of slots 46, 48 and 50 may, for example be 3/16 inch, ¼ inch, and 5/16 inch, respectively, to accommodate the similarly sized drill bits.

Members 30 and 32 are substantially identical in construction, although their functions differ. Member 30 serves both as an upper clamp member for the workpiece, as well as a lower guide for a drill bit. Member 32, on the other hand, serves as an upper guide for a drill bit for the purposes of determining the depth of the hole to be drilled.

Each of the members 30 and 32 consists of a channel-shaped guide 52 and 54, respectively, which are fixedly positioned to vertical support member 12 by means of thumb screws 38 and 40, respectively.

As illustrated in FIG. 3, each of the channel-shaped guides 52 and 54 includes a plurality of elongated drill guide slots, such as slots 56, 58 and 60 of channel 52 and slots 62, 64 and 66 of channel 54. The three slots positioned along guides 52 and 54 are identically shaped and positioned as slots 46, 48 and 50 in anvil plate 28.

The channel-shaped guides 52 and 54 each also include a sliding drill guide plate 68 and 70, respectively, which is slidingly received within the side walls of the channel-shaped guides 52 and 54. Formed through the sliding drill guide plates 68 and 70 are three groups of drill bit guide holes 72, 74 and 76, which are respectively triangularly positioned on the associated plate. For example, the first group 72 of drill bit guide holes comprises a pair of side holes 78 and 80 and a centered hole 82. The diameters of holes 78, 80 and 82 corresponds to the width of associated guide slots 62, 56 and 46. In a similar fashion, the diameters of the guide holes belonging to the second group 74 corresponds to the width of the corresponding guide slots 48, 58 and 64, while the diameters of the third group 76 of drill bit guide holes corresponds to the width of associated slots 50, 60 and 66. The diameters of the first group of holes 72 may therefore be, for example, 3/16 inch, while the diameter of the second group 74 may be ¼ inch, and the diameter of the third group 76 may be 5/16 inch.

Further, the position of the side holes 78 and 80 are aligned with the ends of the correspondingly positioned slots 46, 56 and 62, while the middle hole 82 is substantially centered in the respective slots. Note that the sliding plates 68 and 70 may be provided with handles or gripping members 84 and 86, respectively, to facilitate adjustment thereof to the desired position.

In operation, the upper clamp member 30 and lower anvil plate 28 are first positioned along vertical support member 12 to accommodate the thickness of the particular workpiece W and in accordance with the size of the pilot hole desired to be formed transversely to the rectangular mortise. The exemplary setup illustrated in FIG. 3 shows the aperture 22 centered on the edge of the workpiece W to permit drilling of a pilot hole of, for example ¼ inch in diameter. The support member 26 is then affixed to bar 12 to permit the threaded clamp member 42 to be actuated against the underside of anvil plate 28 so as to secure workpiece W in position.

The upper depth plate 32 is then vertically adjusted along bar 12 to a position selected such that the tip of the drill bit D will enter and extend beyond the center of the thickness of the workpiece W approximately ⅜ inch. The precise distance beyond the center of the workpiece that it is desired to drill would depend upon the size of the nut and bolt to be used. It also depends upon the length of the drill bit D, which may be conveniently tabulated in a chart and correlated with the thickness of the wood and the size of the bolt.

The sliding drill guide plates 68 and 70 are then moved within their respective channel-shaped guides 52 and 54 until the center holes 82' and 82" become aligned over their respective elongated slots 58 and 64. With the workpiece W secured, the drill D is turned on and positioned through aperture 82", the center of slot 64, aperture 82', the center of slot 58, and into the workpiece W. Once the hole has been drilled in workpiece W to the depth determined by the position of member 32, the drill bit D is withdrawn, and the guide plates 68 and 70 are repositioned until the respective side holes 78" and 80" (FIG. 1) become positioned over the respective ends of slots 64 and 58. Two holes are then drilled in the workpiece W via the double aligned end holes in each of the sliding plates 68 and 70 and their corresponding elongated slots 58 and 64. By virtue of the positioning of holes 78, 80 and 82 in the sliding plates 68 and 70 so as to substantially overlap one another, drilling of the three holes acts to form a substantially rectangular mortise in the wood to a width and depth which will house a standard square or hex nut corresponding to the size of the bolt desired to be used.

After the desired rectangular slot is formed, the same sized drill bit D is used to form the perpendicular pilot hole via guide aperture 22. The pilot hole through guide 22 is drilled through workpiece W a depth sufficient to meet and extend through the mortised slot. It should be noted that the slots 46, 48 and 50 in anvil plate 28 prevent the wood from splintering on any drill-through operations which may be desired to be performed. The provision of the upper depth plate 32 further serves to ensure that the drill D always enters the holes of both bars 30 and 32 at the same angle to ensure a clean and squared-off slot formation in the workpiece W. This, in turn, ensures that the nut to be fitted within the slot will be held securely so that the resulting wood joint is strong.

Obviously, numerous modifications and variations of the present invention will be possible in light of the above teachings. For example, the invention may be used to successfully joint other materials such as plastics, soft metals, and the like. It is therefore to be understood that within the scope of the appended claims, the invention may be practiced otherwise than as specifically described herein.

I claim as my invention:

1. A drill jig, which comprises: an elongated support member; means connected transversely to said elongated support member for clamping a workpiece; and first drill guide means adjustably mounted on and extending transversely from said support member and positioned in use adjacent said workpiece for permitting formation of a rectangular mortise therein; said drill guide means comprising a channel-shaped member having at least one elongated through slot formed therein, and a drill guide plate slidably disposed within said channel-shaped member and including at least three substantially circular guide holes formed therethrough; wherein said three guide holes formed in said guide plate are disposed in a triangular configuration and two of said three guide holes may be aligned over the respective ends of said elongated through slot in said channel-shaped member while the third of said three guide holes may be aligned over the middle of said elongated through slot in said channel-shaped guide member; said elongated support member including at least one guide hole extending transversely therethrough for permitting formation of a pilot hole in said workpiece which is substantially perpendicular to said rectangular mortise.

2. The drill jig as set forth in claim 1, wherein said rectangular mortise is adapted for holding a nut.

3. The drill jig as set forth in claim 2, wherein said pilot hole is adapted for receiving a bolt for engaging said nut.

4. A drill jig, which comprises: an elongated support member; means connected to said elongated support member for clamping a workpiece; and first drill guide means adjustably mounted on said support member and positioned in use adjacent said workpiece for permitting formation of a rectangular mortise therein; said first drill guide means comprising a channel-shaped member having at least one elongated through slot formed therein, and a drill guide plate slidably disposed within said channel-shaped member and including at least three substantially circular guide holes formed therethrough and disposed in a triangular configuration; wherein said channel-shaped member further includes a plurality of differently sized elongated through slots, and said drill guide plate includes a plurality of sets of three substantially circular guide holes, and holes within each of said sets corresponding in diameter with the width of the respective ones of said elongated through slots.

5. A drill jig, which comprises; an elongated support member; means connected to said elongated support member for clamping a workpiece; first drill guide means adjustably mounted on said support member and positioned in use adjacent said workpiece for permitting formation of a rectangular mortise therein; said first drill guide means comprising a channel-shaped member having at least one elongated through slot formed therein, and a drill guide plate slidably disposed within said channel-shaped member and including at least three substantially circular guide holes formed therethrough; and second drill guide means adjustably mounted on said support member above said first drill guide means for providing control of the depth of said rectangular mortise in said workpiece.

6. The drill jig as set forth in claim 5, wherein said second drill guide means is substantially identical to said first drill guide means.

7. A drill jig, which comprises; an elongated support member; means connected to said elongated support member for clamping a workpiece; first drill guide means adjustably mounted on said support member and positioned in use adjacent said workpiece for permitting formation of a rectangular mortise therein; said first drill guide means comprising a channel-shaped member having at least one elongated through slot formed therein, and a drill guide plate slidably disposed within said channel-shaped member and including at least three substantially circular guide holes formed therethrough; and wherein said clamping means comprises a horizontal support member adjustably mounted to said elongated support member and disposed below said first drill guide means, and a clamp support member mounted to said elongated support member and disposed below said horizontal support member and having threaded clamping means extending therethrough for urging said horizontal support member towards said first drill guide means for clamping said workpiece therebetween.

8. The drill jig as set forth in claim 7, wherein said horizontal support member includes at least one elongated through slot formed therein which is aligned with and substantially identical to said elongated through slot formed in said channel-shaped guide member.

* * * * *